(12) United States Patent
Hommel

(10) Patent No.: US 10,053,890 B2
(45) Date of Patent: Aug. 21, 2018

(54) HOLDER

(71) Applicant: ABUS August Bremicker Söhne KG, Wetter-Volmarstein (DE)

(72) Inventor: Martin Hommel, Rehe (DE)

(73) Assignee: ABUS AUGUST BREMICKER SÖHNE KG, Wetter-Volmarstein (DE)

( * ) Notice: Subject to any disclaimer, the term of this patent is extended or adjusted under 35 U.S.C. 154(b) by 102 days.

(21) Appl. No.: 15/181,791

(22) Filed: Jun. 14, 2016

(65) Prior Publication Data

US 2016/0369531 A1    Dec. 22, 2016

(30) Foreign Application Priority Data

Jun. 19, 2015  (DE) .......................... 10 2015 109 860

(51) Int. Cl.
| | |
|---|---|
| *E05B 71/00* | (2006.01) |
| *B62H 5/00* | (2006.01) |
| *B62J 11/00* | (2006.01) |
| *E05B 17/00* | (2006.01) |

(52) U.S. Cl.
CPC ............. *E05B 71/00* (2013.01); *B62H 5/00* (2013.01); *B62H 5/001* (2013.01); *B62J 11/00* (2013.01); *E05B 17/00* (2013.01)

(58) Field of Classification Search
CPC ........... E05B 71/00; E05B 17/00; B62J 11/00; B62H 5/00; B62H 5/001
USPC ....................................................... 224/441
See application file for complete search history.

(56) References Cited

U.S. PATENT DOCUMENTS

| | | | | | |
|---|---|---|---|---|---|
| 4,966,382 | A | * | 10/1990 | Giles ......................... | B62J 11/00 224/275 |
| 5,167,353 | A | * | 12/1992 | Hughes ..................... | B62J 11/00 224/448 |
| 5,251,464 | A | * | 10/1993 | Halter ..................... | B62H 5/003 224/427 |

(Continued)

FOREIGN PATENT DOCUMENTS

| | | |
|---|---|---|
| DE | 20119348 U1 | 1/2002 |
| DE | 102006054048 A1 | 5/2008 |

(Continued)

*Primary Examiner* — Peter Helvey
(74) *Attorney, Agent, or Firm* — Harness, Dickey & Pierce, P.L.C.

(57) ABSTRACT

A holder for a two-wheeler lock, in particular of the type of a folding lock, has a support region for contacting a tube section of a two-wheeler, and a mount which comprises at least one first holding section and one second holding section, wherein the first holding section and the second holding section are spaced apart from one another and define a reception opening for the two-wheeler lock, and wherein the first holding section includes an angle with the second holding section. The holder is characterized in that the angle between the first holding section and the second holding section is variable, with the holder having a locking device which is effective between the first holding section and the second holding section of the holder and which has a clamping lever which is movable between a fixing position and a removal position, with the two-wheeler lock located in the reception opening being fixable by means of clamping by a movement of the clamping lever out of the removal position into the fixing position.

19 Claims, 10 Drawing Sheets

(56) References Cited

U.S. PATENT DOCUMENTS

Figure 1:
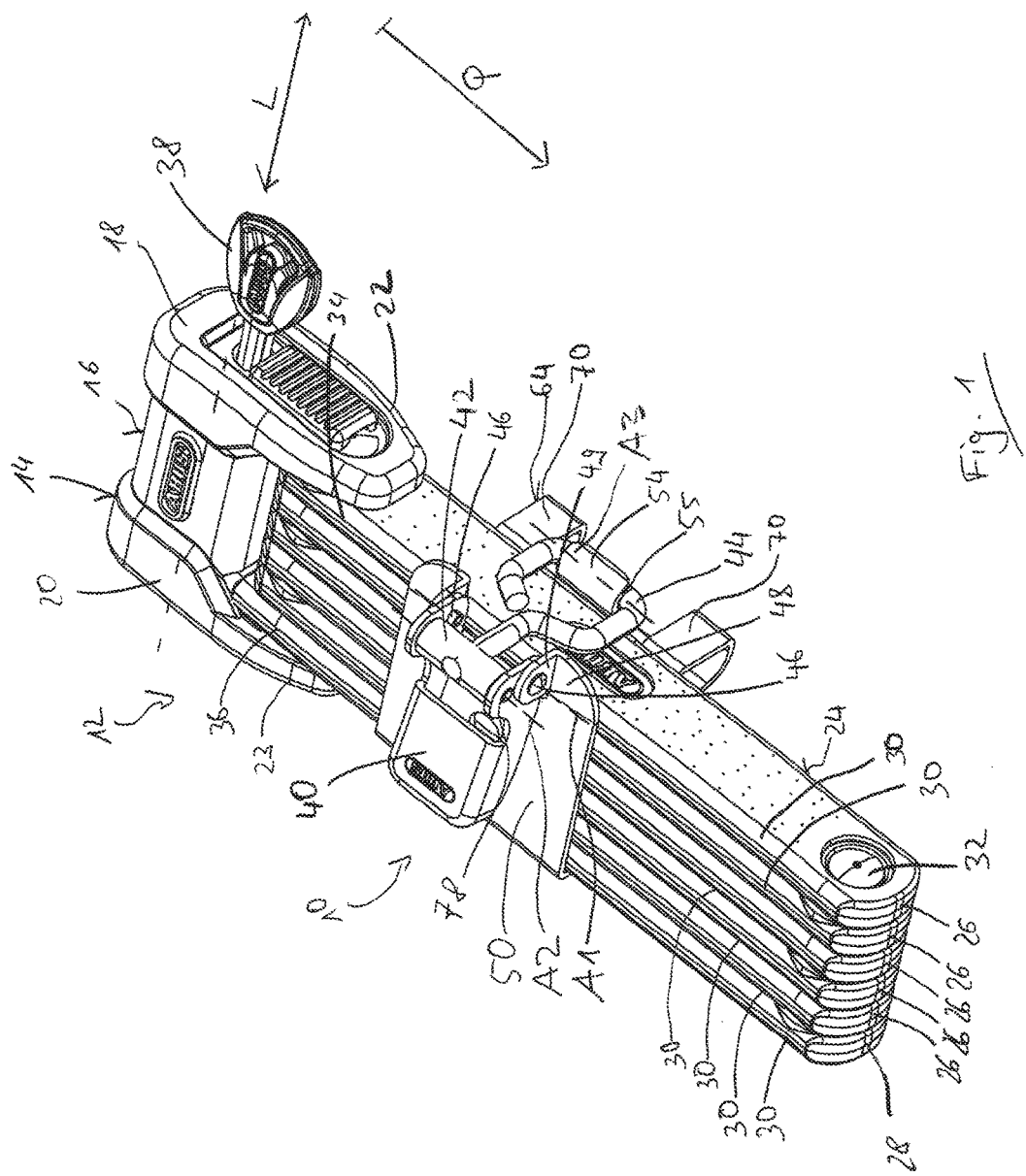

| | | | | |
|---|---|---|---|---|
| 5,380,061 | A * | 1/1995 | Pendleton | B62H 5/001 297/195.1 |
| 5,575,443 | A * | 11/1996 | Honeycutt | B62J 1/16 248/231.9 |
| 5,709,113 | A * | 1/1998 | Godfrey | B62H 5/00 70/227 |
| 5,833,188 | A | 11/1998 | Studdiford et al. | |
| 6,431,422 | B1 * | 8/2002 | Moore | B62J 1/16 224/427 |
| 6,557,808 | B1 * | 5/2003 | Ling | B62H 5/00 224/425 |
| 7,311,233 | B2 * | 12/2007 | Chen | B62J 11/00 224/425 |
| 9,079,626 | B2 * | 7/2015 | Zuraski | B62J 11/00 |
| 9,302,725 | B2 * | 4/2016 | Ton | B62H 5/001 |
| 9,340,997 | B2 * | 5/2016 | Zuraski | B62H 5/00 |
| 9,341,004 | B2 * | 5/2016 | Elson | B62H 5/00 |
| 9,505,124 | B2 * | 11/2016 | Greenblatt | B25H 3/04 |
| 9,694,867 | B2 * | 7/2017 | Ton | B62J 9/001 |
| 2009/0001687 | A1 | 1/2009 | Chao | |
| 2014/0042201 | A1 | 2/2014 | Weiershausen et al. | |
| 2016/0215527 | A1 | 7/2016 | Steinkamp | |

FOREIGN PATENT DOCUMENTS

| | | |
|---|---|---|
| DE | 102013102009 A1 | 9/2013 |
| DE | 202014103690 | 8/2014 |
| DE | 202015103108 U1 | 7/2015 |
| DE | 202014102172 U1 | 8/2015 |

* cited by examiner

HOLDER

The present invention relates to a holder for a two-wheeler lock, in particular of the type of a folding lock, having a support region for contacting a tube section of a two-wheeler, and having a mount which comprises at least one first holding section and one second holding section, wherein the first holding section and second holding section are spaced apart from one another and define a reception opening for the two-wheeler lock, and wherein the first holding section includes an angle with the second holding section.

Such holders are known, for example, from U.S. Pat. No. 5,833,188, DE 102012214211A1 and DE102013102009A1 and are required to fasten two-wheeler locks permanently or temporarily—for example during a journey—to the two-wheeler. The holder can for this purpose preferably be permanently mounted at the two-wheeler. The tube section can be a tube section of the frame, of the carrier or of the saddle tube of the two-wheeler.

The holder is typically adapted to the respective two-wheeler lock to be fastened. This means that a spacing between the holding sections and a size of the reception opening are matched to the respective two-wheeler lock to be fastened. Other two-wheeler locks can disadvantageously not be fastened, or can only be insufficiently fastened, i.e. in particular with considerable clearance, by means of the holder due to the matching to a specific two-wheeler lock. Such a non-matched fastening of the two-wheeler lock to the holder can produce a flapping to and fro of the lock in the holder or a knocking of individual components of the lock (e.g. individual joint bars) and can thus produce unwanted noises or wear phenomena of the two-wheeler lock.

It is the object of the invention to provide a holder for a two-wheeler lock by which different locks can be fastened in a secure manner.

This object is satisfied by a holder having the features of claim 1 and in particular in that the angle between the first holding section and the second holding section is variable, with the holder having a locking device which is mount between the first holding section and the second holding section of the holder and which has a clamping lever which is movable between a fixing position and a removal position, with the two-wheeler lock located in the reception opening being fixable by means of clamping by a movement of the clamping lever out of the removal position into the fixing position.

The holding sections are flexible with respect to one another in this holder, i.e. they can be moved toward and away from one another reversibly, whereby the angle between the holding sections changes. The angle between the holding sections can be defined with respect to a cross-section through the reception opening by two straight lines which each indicate a direction of extent of the holding sections. The two holding sections thus form two limbs which bound the cross-section of the reception opening. The angle between the two holding sections can in particular have a value of 90° or a value of <90° in the starting position of the mount, that is before the two-wheeler lock is inserted into the reception opening.

A spacing between the first holding section and the second holding section (in particular in the fixing position relative to the removal position of the clamping lever) can be reduced by the changing of the angle, whereby a clamping effect occurs and/or a clamping effect can be brought about at least by displacing the clamping lever from the removal position into the fixing position. With a two-wheeler lock placed into the mount, the two-wheeler lock is fixable in this manner by means of clamping to the mount.

Provision can in particular be made in this respect that the two-wheeler lock can already be received in the removal opening of the clamping lever while forming a provisional clamping seat in the reception opening, i.e. the mount acts in the manner of a clamp. In this case, when the two-wheeler lock is inserted into the reception opening, the angle between the first holding section and the second holding section is increased, i.e. the two holding sections are hereby spread apart from one another. Provision can also be made that the angle between the first holding section and the second holding section is changed (in particular reduced) by the movement of the clamping lever from the fixing position into the removal position. However, the two-wheeler lock can at least be fixed (finally) by means of clamping by moving the clamping lever out of the removal position into the fixing position after the insertion of the two-wheeler lock into the reception opening.

In accordance with the invention, a locking device having a clamping lever is therefore provided, wherein the two holding sections can be moved toward one another (i.e. the angle between the first holding section and the second holding section can be reduced) by moving the clamping lever out of the removal position into the fixing position, and/or wherein a clamping effect provided between the two holding sections can be brought about or amplified (without the angle between the first holding section and the second holding section having to be reduced in this respect, e.g. because the two holding sections already contact the two-wheeler lock).

For example, the first and second holding sections can be configured such that the first and second holding sections are oriented substantially in parallel with one another in the fixing position of the clamping lever. This has the result that a clamping force acting on the two-wheeler lock can be distributed almost completely over the surface of the holding sections.

It is generally preferred for the two-wheeler lock to be receivable in a shape-matched manner in the reception opening of the holder, i.e. for the mount to be shaped in a complementary manner to the two-wheeler lock along the periphery of the two-wheeler lock or along a part of the periphery of the two-wheeler lock.

It is of advantage with the holder in accordance with the invention that a two-wheeler lock to be fastened is also reliably held on a jerky travel of the two-wheeler due to the clamping between the holding sections. In addition, the holder can be used for different two-wheeler locks since a clamping can respectively occur at a different angle between the holding sections with different two-wheeler locks, wherein the holding sections can be brought into different angles with respect to one another by inserting the two-wheeler lock into the reception opening and/or by displacing (e.g. folding over) the clamping lever. Any clearance which results from different sizes or diameters of different two-wheeler locks is taken up by the clamping or by the variable angle between the two holding sections. A force transmission can also be effected by the clamping which prevents a relative movement and thus an unwanted knocking of individual components of the lock (e.g. of individual jointed bars) during the travel.

Advantageous embodiments of the invention can be seen from the description, from the dependent claims and from the drawings.

In accordance with an advantageous embodiment, the locking device also comprises a clamping hoop, wherein a first pivotal connection having a first pivot axis is provided between the clamping lever and the first holding section of the mount, wherein a second pivotal connection having a second pivot axis is provided between the clamping hoop and the clamping lever, and wherein a third pivotal connection having a third pivot axis is provided between the clamping lever and the second holding section of the mount, with at least one of the three named pivotal connections being releasable to be able to open the locking device for an insertion or removal of a two-wheeler lock into or out of the reception opening, with the respective pivotal connection having a first connection device and a second connection device. The respective pivotal connection can thus selectively be closed via the first and second connection devices, for example to fasten the clamping hoop permanently connected in an articulated manner to the clamping hoop to the second holding section of the mount. The first holding section and the second holding section of the mount can be moved toward one another via the clamping hoop by pivoting the clamping lever (about the first pivot axis) to reduce the angle between the first and second holding sections and hereby to effect the explained fixing by clamping, that is the tensioning of the two-wheeler lock within the reception opening.

The first, second and third pivot axes can in particular extend in parallel with one another. The first pivot axis and the second pivot axis can, for example, be supported in mutually oppositely disposed parallel surfaces of the clamping lever. Standard components can preferably be used for the clamping lever, whereby the manufacture of the holder can take place particularly economically and inexpensively.

The locking device can further preferably at least be releasable from one of the two holding sections, whereby the locking device in the removal position does not impede a removal or introduction of the two-wheeler lock from or into the holder. The use of the holder can be simplified in this manner. For this purpose, the first and second connection devices can in particular be temporarily separated from one another. It is also possible to provide the named releasable pivotal connection at the position of the second pivot axis, that is between the clamping lever and the clamping hoop.

The first and second connection devices for the named releasable pivotal connection can in particular have a projection (e.g. a hook, axial element, hoop section or the like), on the one hand, and an associated counter-element (e.g. having a recess, opening or the like), on the other hand. A shape-matched, but rotationally movable connection can thus preferably be created between the two parts of the locking device (e.g. between the clamping hoop and the second holding section of the mount).

The clamping hoop can, for example, be bent or shaped from a round steel wire in a preferred embodiment, wherein the clamping hoop can sectionally engage into a depression of a reception projection of the second holding section to establish a connection to the second holding section. The clamping hoop can in particular have a straight shaped cross-section which engages into a depression of the reception projection. The second connection device can accordingly comprise the reception projection with the depression. Due to the clamping effect, a force can act on the clamping hoop in the fixing position of the clamping lever which fixes the clamping hoop in the depression of the reception projection and thus also makes a release almost impossible with strong vibrations. The clamping hoop can in this respect be covered regionally by an elastic material such as rubber, silicone or similar in order not to cause any unwanted noises or damage on an engagement into the depression of the reception projection.

The clamping hoop preferably has a transverse section which defines the named third pivot axis and has a longitudinal section which is oriented perpendicular to the transverse section and which connects the transverse section to the clamping lever (in particular to an axial element of the clamping lever which is aligned in parallel with the transverse section and defines the named second pivot axis such as will be explained in the following).

In accordance with a further advantageous embodiment, the clamping hoop has an effective length between the second pivot axis and the third pivot axis, the effective length being adjustable. How large the spacing between the first holding section and the second holding section is in the fixing position can be set by means of the effective length of the clamping hoop. The angle between the holding sections in the fixing position can thus also be set via the effective length of the clamping hoop. The adjustability of the clamping hoop can therefore make it possible to adapt the holder to different two-wheeler locks so that the different two-wheeler locks can be fastened to the holder reliably and fixedly.

The effective length of the clamping hoop is preferably adjustable steplessly and/or by means of a screw thread. The named second pivot axis can, for example, be formed by an axial element which is rotatably supported at the clamping lever and which is preferably cylindrical, with the clamping hoop being able to be displaced at or in the axial element. In this respect, the clamping hoop can be connectable to the axial element of the clamping lever by means of a screw thread, with the effective length of the clamping hoop being able to be varied by a rotation thereof (about the axis of the screw thread). An internal thread traversing the axial element of the clamping lever is preferably provided into which an external thread of the clamping hoop engages. The effective length of the clamping hoop can then in particular be varied in steps of half-turns of the clamping hoop.

The clamping hoop can, for example, have an M5 thread to connect the clamping hoop to the clamping lever.

Alternatively, the clamping hoop does not comprise any thread and is steplessly displaceable in the axial element. The clamping hoop can then be fixed in the axial element e.g. by a fixing means (as described in the following).

Due to the variability of the effective length, the holder can also be adapted in a simple manner when, in addition to the two-wheeler lock, further articles such as wrenches or other tools are to be fastened to the holder in addition to the lock. In this case, a larger spacing is required between the holding sections in the fixing position, with the spacing being able to be provided by extending the effective length of the clamping hoop.

In accordance with a preferred embodiment, an adjustment of the effective length of the clamping hoop by means of a fixing means can selectively be inhibited. This means that the set effective length of the clamping hoop cannot be varied in a fastening position of the fixing means. The clamping hoop is then fixed in the axial element. In an open position of the fixing means, in contrast, a setting of the effective length of the clamping hoop can be carried out. The provision of a fixing means brings about the advantage that an unintentional adjustment of the clamping hoop, for example in the release position of the clamping lever, can be prevented. The effective length of the clamping hoop can only be varied and thus set on a moving of the fixing means into the open position.

In accordance with a further advantageous embodiment, the fixing means is arranged rotatable about the second pivot axis and/or the fixing means is a component of a bearing seat of the second pivot axis. The fixing means can therefore e.g. be provided in the axial element and can in particular be arranged in the axial element such that it serves as a bearing seat for the axial element. The fixing means can for this purpose extend sectionally within the axial element and can have a bearing section which is always disposed outside the axial element and which serves as a bearing pin for the named second pivotal connection.

The fixing means particularly preferably comprises a threaded pin which extends axially along the second pivot axis, with a first axial end of the threaded pin selectively exerting a force on the clamping hoop in order to fix it at the axial element (in particular with respect to a rotary movement). The threaded pin can preferably be screwed to the axial element. The threaded pin can e.g. be a grub screw which is screwed to a further internal thread of the axial element. Both the further internal thread of the axial element and the threaded pin can extend coaxially with respect to one another along the second pivot axis.

An engagement depression which allows an engagement with a tool (e.g. a hexagon socket wrench) can be provided at a second axial end of the threaded pin in the bearing section to rotate the threaded pin. The fixing means can be set in its relative position with respect to the clamping hoop by means of the tool and can in particular be moved from the open position into the fastening position by screw movements. The fixing means can, for example, fix the clamping hoop in the fastening position by clamping in the axial element, whereby an adjustment of the clamping hoop is suppressed.

The first axial end of the threaded pin can in particular press against the longitudinal section of the clamping hoop provided that the threaded pin is screwed sufficiently far into the axial element. A position in which the threaded pin presses onto the clamping hoop corresponds to the above-named fastening position. The length of the threaded pin can be selected such that the bearing section of the threaded pin projects axially out of the axial element at one side in the fastening position, with the bearing section being able to serve for the rotatable support of the axial element.

The axial element can additionally have a bearing spigot which, together with the projecting section of the threaded pin, defines a rotational axis of the axial element which can also be called a second pivot axis.

A direction in which the fixing means extends into the axial element can be perpendicular to the direction which is defined by the longitudinal section of the clamping hoop or by the direction of the internal thread traversing the axial element.

The adaptation of the holder to a specific two-wheeler lock is described by way of example in the following. The fixing means can first be located in the open position, i.e. the threaded pin is only screwed so far into the axial element that the threaded pin does not contact the clamping hoop. The adaptation of the effective length of the clamping hoop to the two-wheeler lock is thereby made possible. Once a suitable effective length has been set (e.g. by rotating or shifting the clamping hoop), the threaded pin can be screwed so far into the axial element by means of a hexagon socket wrench or the like that the threaded pin holds the clamping hoop in the set position with respect to the axial element by means of clamping. A further change of the effective length is suppressed in the fastening position of the threaded pin thus reached.

In accordance with a further advantageous embodiment, the clamping hoop is urged away from the first or second holding sections at least in the release position by means of a clamping element. The clamping hoop can, for example, be automatically rotated about the second pivot axis by a spring (e.g. a torsion spring) as soon as the clamping lever is moved from the fixing position into the release position. As a consequence, the clamping hoop can, for example, "shoot up" from the named depression of the reception projection in order not to stand in the way on the removal and reinsertion of the two-wheeler lock out of and into the holder.

The named second pivot axis (pivot axis between the clamping hoop and the clamping lever) in a dead center position of the locking device is particularly preferably on a straight line which extends through the third pivot axis (pivot axis between the clamping hoop and the second holding section of the mount) and through the first pivot axis (pivot axis between the clamping lever and the first holding section of the mount). The dead center position of the locking device is in this respect characterized in that a force temporarily has to be applied for the displacement of the locking device from the removal position into the fixing position and/or from the fixing position into the removal position, wherein a target position (i.e. the fixing position or the removal position) is adopted essentially automatically after overcoming the dead center position. The dead center position thus represents an unstable intermediate position between the removal position and the fixing position.

In the dead center position, the first, second and third pivot axes can be aligned with one another, with a maximum return force acting on the second pivot axis which in particular results from the explained clamping of a two-wheeler lock in the reception opening of the mount. The clamping lever can be driven at both sides of the dead center position by the exerted force, and indeed either in the direction of the removal position or in the direction of the fixing position. The provision of a dead center position is in particular of advantage since a force has to be applied to reach the dead center position. An unintentional actuation or release of the clamping lever during the journey can be avoided with high certainty for this reason. A high lack of sensitivity to vibrations during travel can additionally be achieved in this manner.

In accordance with a further advantageous embodiment (with or without the aforesaid clamping hoop), the holder at least has an elasticity which is tensioned (e.g. compressed or expanded) when a two-wheeler lock is inserted into the reception opening and the clamping lever is moved into the fixing position and hereby exerts a holding force on the two-wheeler lock, on the one hand, and stabilizes the clamping lever in the fixing position, on the other hand, wherein the elasticity is adapted to be increasingly tensioned by moving the locking device or the clamping lever in the direction of a or the aforesaid dead center position and to increasingly relax after passing through the dead center position. In other words, the elasticity serves, on the one hand, to build up a return force which supports or effects the desired clamping for fixing the two-wheeler lock in the reception opening and, on the other hand, to drive the clamping lever in the direction of the fixing position or of the removal position and to hold it stable in the respective position after passing through the dead center position.

The elasticity is preferably formed by an inherent elasticity of at least one part of the first holding section and/or of the second holding section of the mount. The inherent elasticity can effect a spreading apart of the first and second holding sections on the relaxation of the elasticity, whereby a removal of the two-wheeler lock from the spread-apart mount is in particular facilitated in the release position. It is additionally of advantage that no separate elastic element is required to define the named dead center position for the locking device when utilizing the inherent elasticity. It is, however, also possible that the elasticity required for the defining of a dead center position is effected by a separate elastic element or that the above-explained inherent elasticity of the mount is supported by a separate elastic element, wherein the separate elastic element can in particular be an elastic support at the first holding section and/or at the second holding section of the mount, e.g. a plastic part and/or the protective element named in the following.

The aforesaid clamping hoop can thus in particular be rigid (i.e. not longitudinally elastic) and can accordingly be able to manufactured simply and inexpensively. The first holding section and/or the second holding section of the mount can in particular have a resilient support section at which the locking device or a part thereof is supported and which can be temporarily deflected (i.e. first temporarily tensioned and then relaxed) on passing through the dead center position of the locking device against its preload. Such a resilient support section can, for example, be angled with respect to a contact section of the respective holding section which is provided for contacting the clamped two-wheeler lock and/or can project beyond the clamped two-wheeler lock. The support section can thus in particular be resilient with respect to a contact section of the respective holding section which is provided for contacting the clamped two-wheeler lock. The clamping lever is preferably pivotably supported at a resilient support section of the first holding section and/or the aforesaid clamping lever is pivotably supported at a resilient support section of the second holding section.

Alternatively, a tension spring or a compression spring which comprises the locking device can be provided as a separate elastic element. Provided that—as explained above—a clamping lever is associated with the clamping lever, such a spring can be integrated in the clamping hoop, whereby the effective length of the clamping hoop can vary on the moving of the clamping lever from the removal position into the fixing position. The effective length of the clamping hoop can in particular be at a maximum in the dead center position.

In accordance with a further advantageous embodiment, the two-wheeler lock can be fastenable to the mount solely by means of clamping between the first holding section and the second holding section. This means that only the clamping is necessary to hold the lock. The holder can thereby be designed in a space saving manner. The holder in particular does not have to form a pocket (e.g. having a pocket base) which holds the two-wheeler lock by supporting. The holding sections—which are considerably smaller in comparison with a pocket—can rather be sufficient for the fastening of the two-wheeler lock.

The spacing of the first holding section and of the second holding section can in particular be selected such that a force which secures the two-wheeler lock against falling out of the holder is already exerted by the holding sections onto the two-wheeler lock on the insertion of the two-wheeler lock into the reception opening of the mount (and still in the removal position of the clamping lever). This means that, on the insertion of the two-wheeler lock, the holding sections can be moved away from one another, whereby a provisional clamping of the two-wheeler lock occurs. This provisional clamping can be sufficient to hold the two-wheeler lock fixed in the holder for so long until the clamping lever has been brought into the fixing position.

The first holding section and the second holding section of the mount are preferably connected by means of a connection section, wherein the first holding section, the connection section and the second holding section together form a C-shaped design or a U-shaped design. Seen spatially, the holder can therefore comprise at least three open sides, whereby a number of possible directions result to insert the two-wheeler lock into the holder. The two-wheeler lock can in particular thus be "laterally" placed into the holder in the removal position of the clamping lever, i.e. through the side of the C-shaped design or a U-shaped design of the mount which is open (in the cross-section of the C-shaped design or a U-shaped design). The use of the holder can be simplified and designed as flexible in this manner.

The possibility of the lateral insertion of the two-wheeler lock also allows the holder to be arranged in corner regions of a two-wheeler frame in which little space is available (in particular too little place for an axial insertion of along the longitudinal axis of the two-wheeler lock). Such an arrangement is also in particular possible since the holder itself—as already mentioned—can be formed as particularly space-saving.

The holding sections can in particular form the limbs of the C-shaped design or a U-shaped design, wherein a spacing between the holding sections in the removal position increases as the spacing from the connection section increases. The holding sections therefore extend in a spread manner. The spread can be reduced against an inherent elasticity of the holder in the fixing position of the clamping lever. In the fixing position, the holding sections can be arranged at least substantially in parallel with one another or can mutually approach as the spacing from the connection section increases.

The first holding section and the second holding section of the mount do not necessarily have to be completely planar. Instead, it is also possible that at least one of the mutually facing flat sides of the first and second holding sections is angled or convexly arched at least sectionally, wherein the named inherent elasticity of the mount is at least partly effected due to the angling or to the convex arching when the two-wheeler lock is inserted into the reception opening of the holder and the clamping lever is brought into the fixing position.

In accordance with a further advantageous embodiment, a protective element for contacting the two-wheeler lock is respectively at least regionally arranged on the first holding section and/or on the second holding section and/or on the connection section of the mount and/or on the support region of the holder. The protective element can, for example, be a molded plastic part (e.g. from a thermoplastic elastomer, TPE) whose shape is adapted to the contour of the holding sections and of the connection section. The protective element can likewise in particular have a C-shaped design or a U-shaped design. The protective element serves to protect the holder itself from damage, in particular from scratches. In addition, noises on the insertion of the two-wheeler lock into the holder can be reduced since the protective element can act as damping. For protection against damage, the protective element lies, with an inserted two-wheeler lock, between the two-wheeler lock and the holding sections or the connection section.

Alternatively or additionally, a further protective element can be arranged in the support region, said protective element protecting the frame of the two-wheeler from damage.

The respective protective element can in particular at least regionally surround the edges of the mount in order e.g. to avoid scratches at the two-wheeler lock or at the frame caused by the edges.

The protective element can—as already mentioned—preferably also serve to provide and/or increase the inherent elasticity of the holder.

The support region further preferably has at least two projections (preferably four projections) which form a guide for the tube section. The projections can define longitudinal edges or corner points of a rectangle, wherein the holder can in particular be fastened to the tube section such that the tube section extends along a longitudinal direction of the rectangle. The projections are preferably each formed in prism shape and can thus form a guide for the tube section.

The support region of the holder is further preferably fastenable to the tube section in the region of the aforesaid guide by means of a hook-and-loop fastener and/or by means of a screw connection using a screw, in particular a single screw, and/or by means of a clip, in particular a single clip. The fastening to the tube section can therefore take place by means of a tensioning hook-and-loop fastener, monoclips, a metric screw connection, hose clips and the like. A scratch protection, e.g. a rubber mat or a rubber hose, can in particular also be provided between the support region and the tube section to avoid damage to the tube section. Instead of a single screw or of a single clip, a plurality of screws, hook-and-loop fasteners and/or clips can serve for the fastening.

In accordance with a further advantageous embodiment, the holder is produced as a punch and bend part and in particular from sheet metal. On use of sheet metal or of other resilient materials, a high inherent elasticity of the holder can result. In this manner, the holder can be shaped reversibly in a wide region when the clamping lever is moved from the removal position into the fixing position. As a consequence, two-wheeler locks with very different sizes can be fastened using the holder.

Alternatively, for example, a stainless steel can also be used for the holder which is provided with a gloss stainless steel finish. On the use of a thin stainless steel material, a high inherent elasticity can also be achieved.

A cut-out into which the second holding section projects (preferably movably projects) is preferably provided in the named connection section which connects the first holding section and the second holding section of the mount. Such a projection of the second holding section into the connection section can be implemented in a simple manner in a punch and bend process in that, first, the cutout is punched into the connection section and subsequently the connection section is bent over such that the second holding section projects into the cut-out. In this manner, the stability of the holder is increased since a "folding apart" of the holder is no longer possible in a simple manner since the part of the first holding section projecting into the cut-out impedes it.

A further subject of the invention is a two-wheeler lock having a holder of the explained kind. The statements made with respect to the holder in accordance with the invention apply accordingly to the two-wheeler lock in accordance with the invention, in particular with respect to preferred embodiments and advantages.

Figure 2:
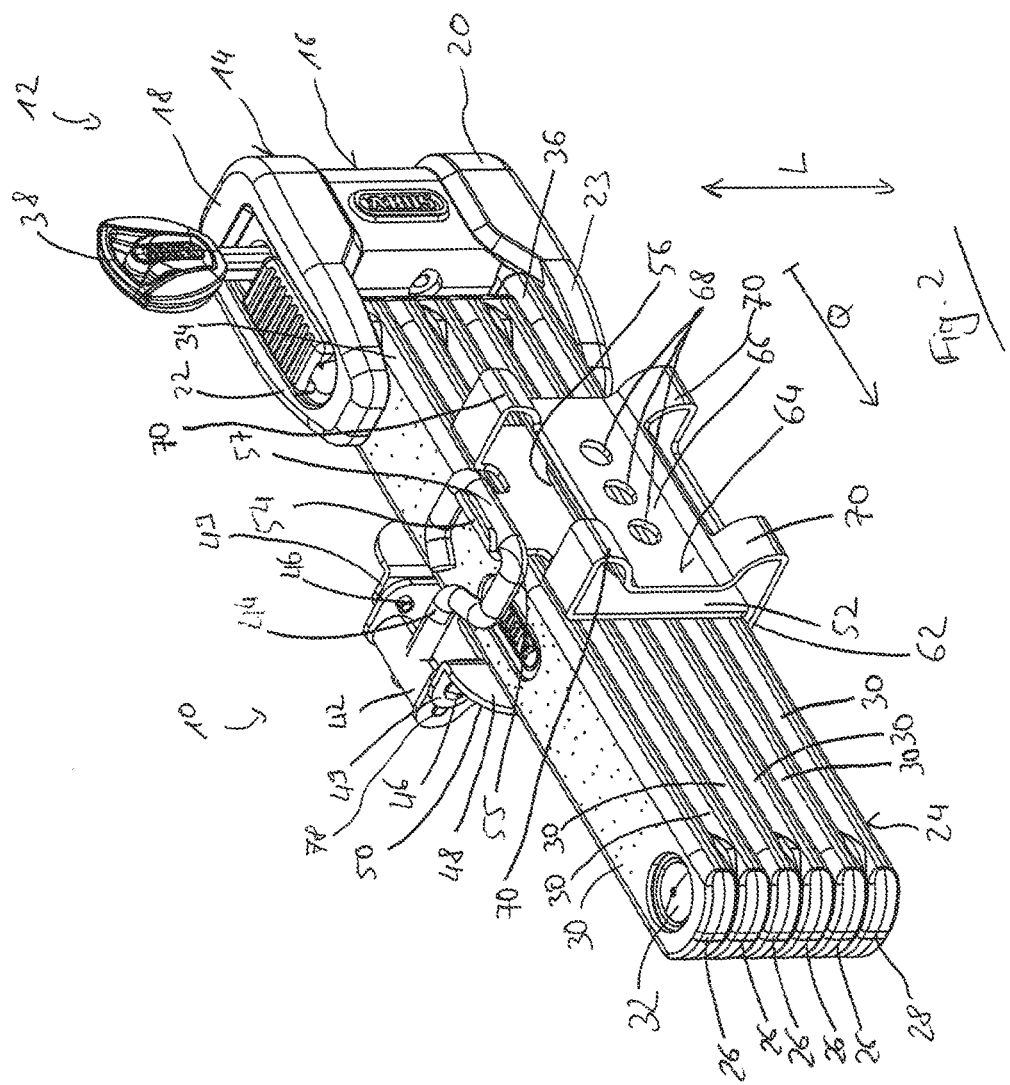
Figure 3:
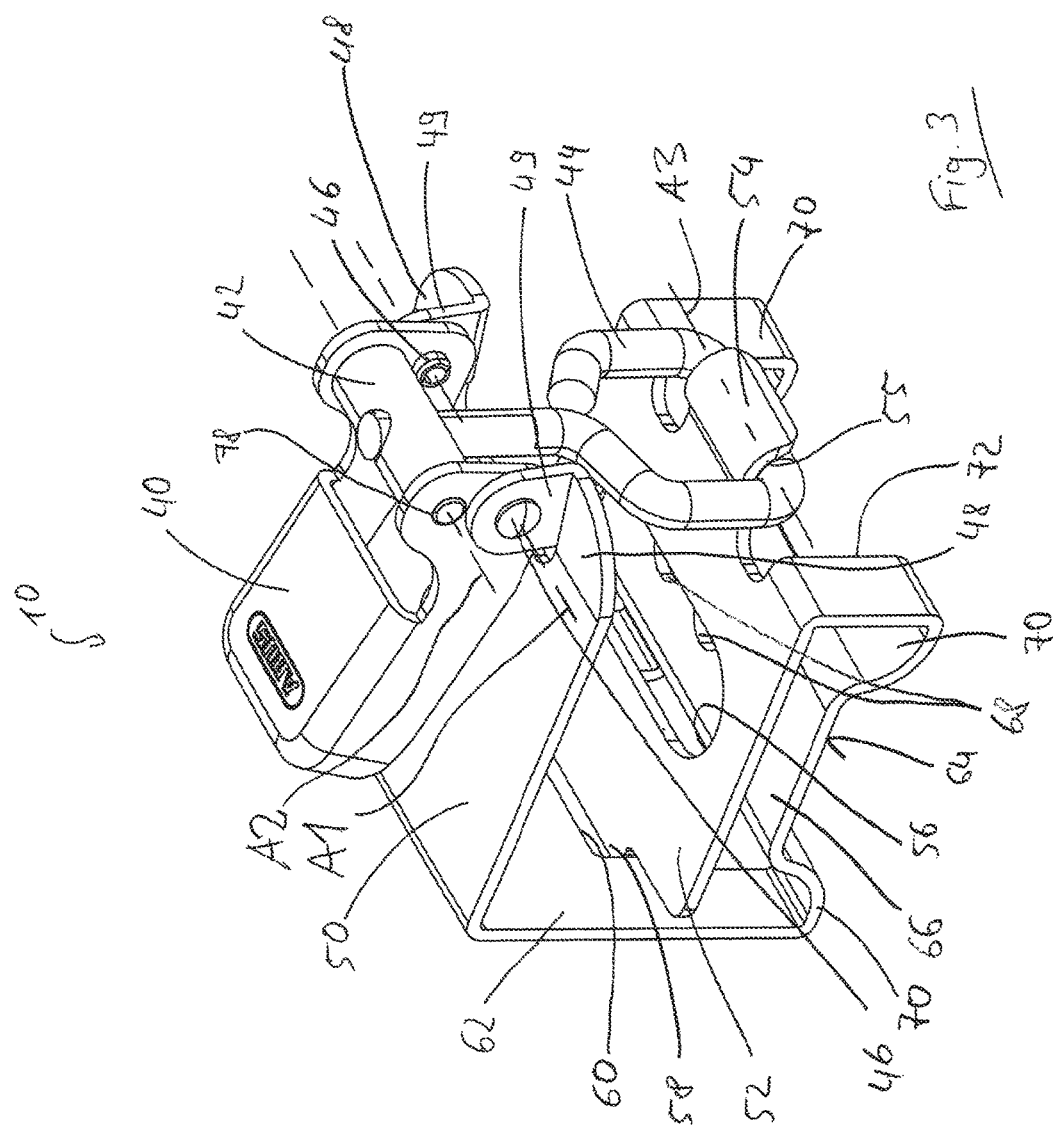
Figure 4:
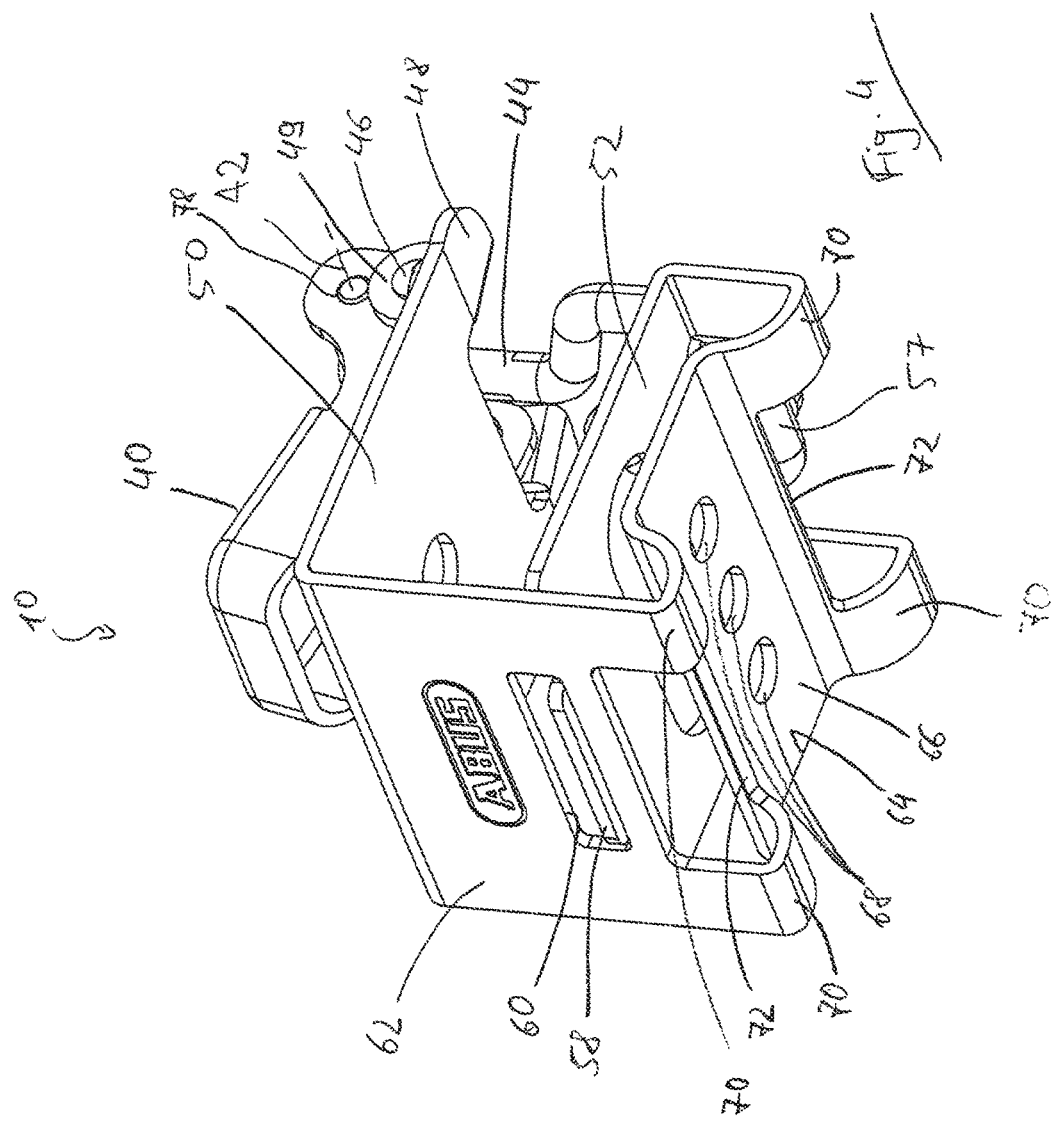
Figure 5:
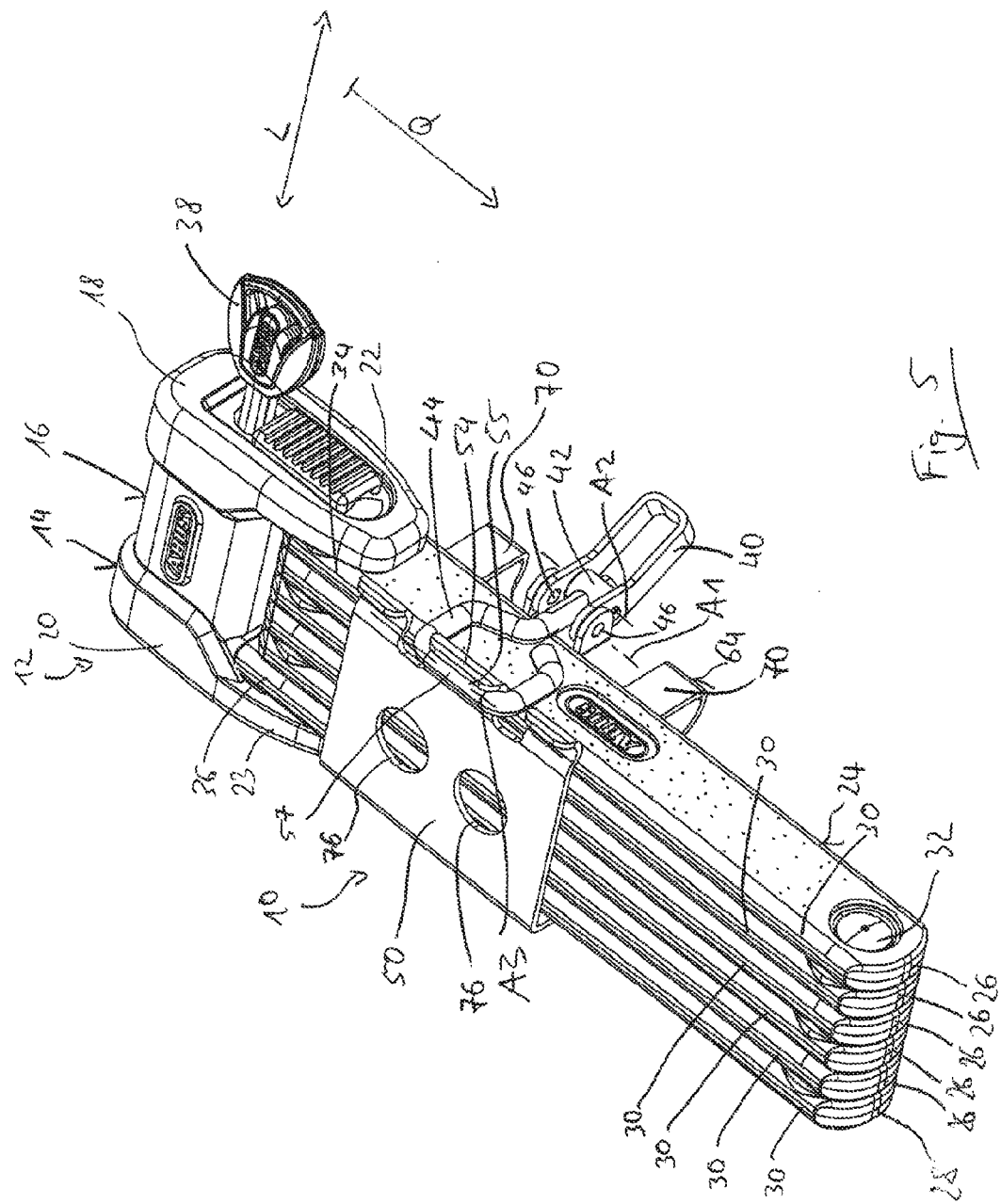
Figure 6:
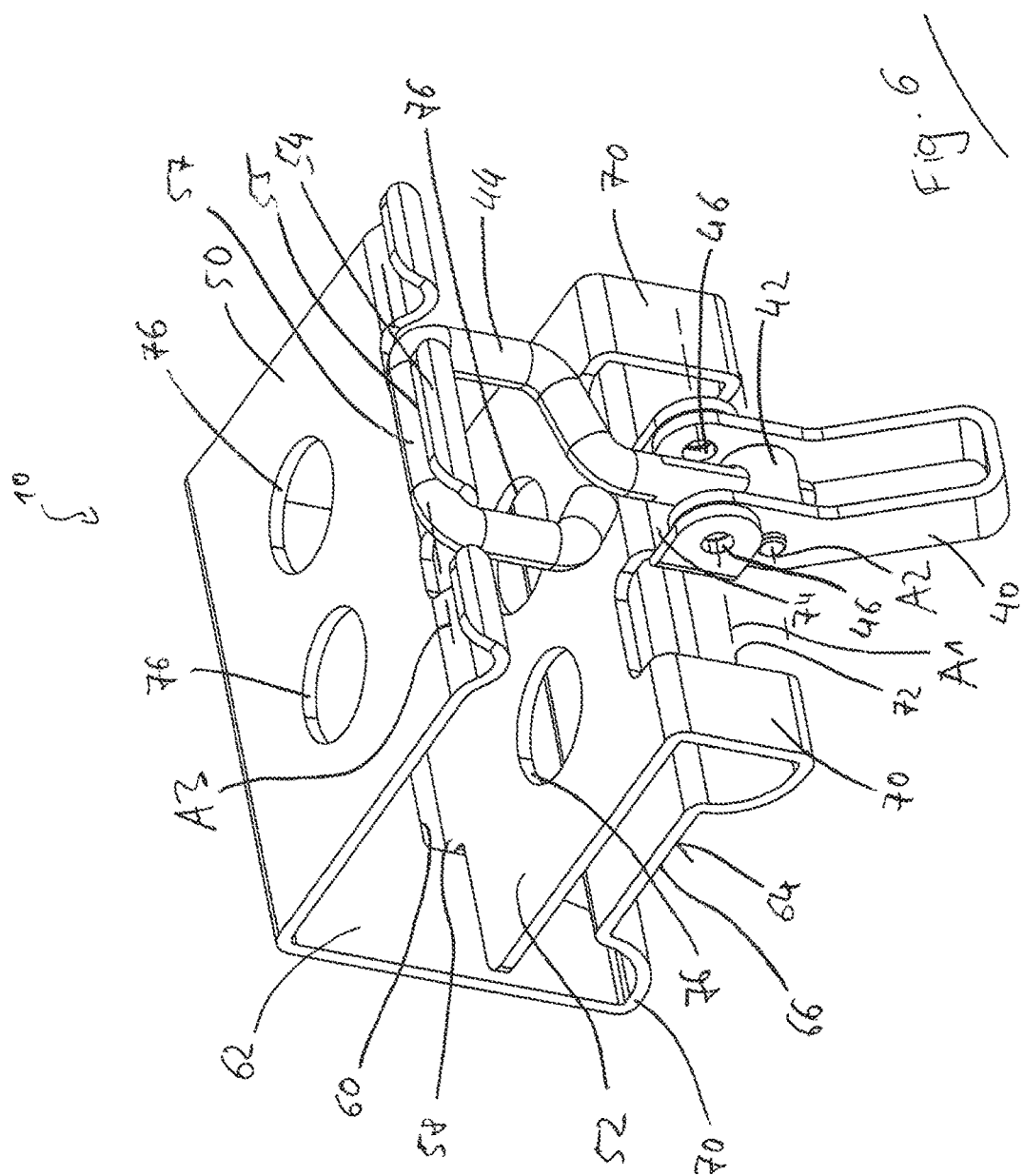
Figure 7:
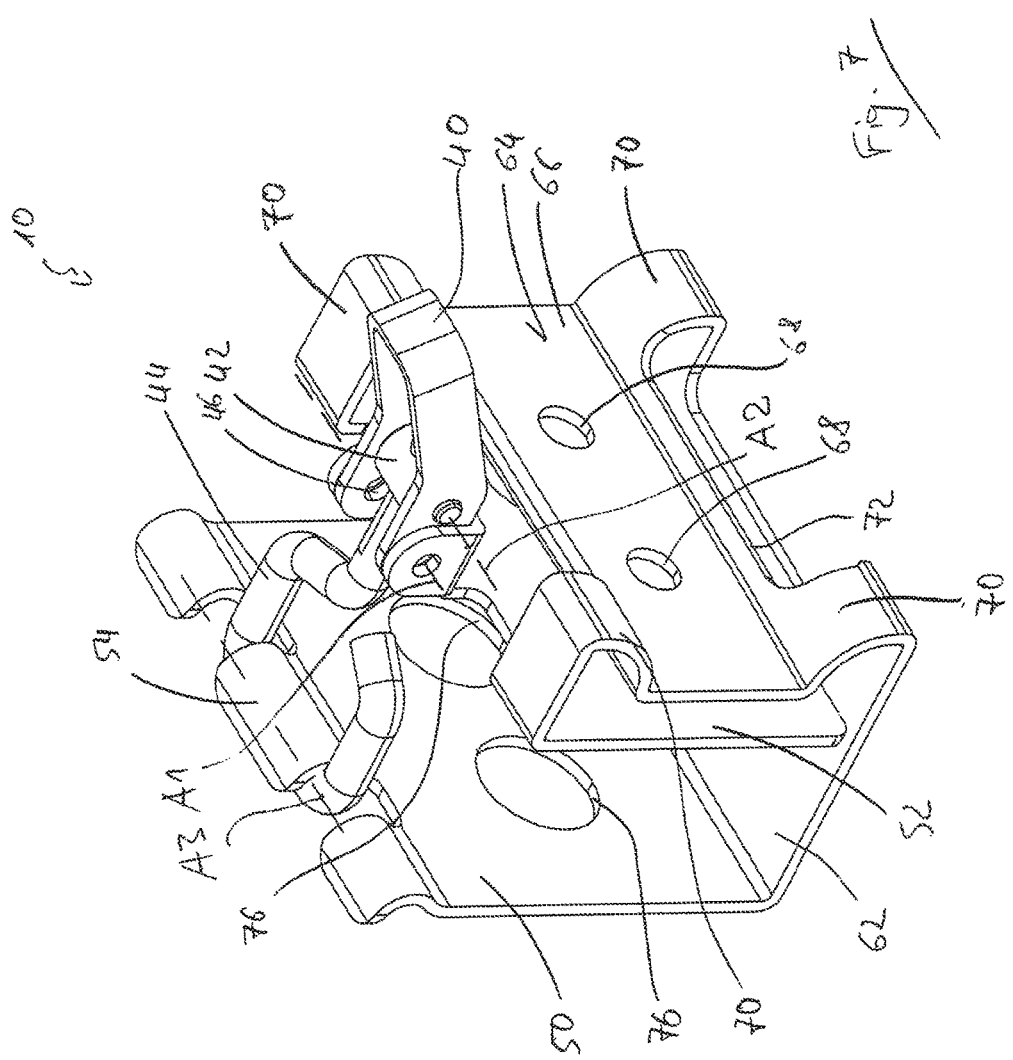
Figure 8:
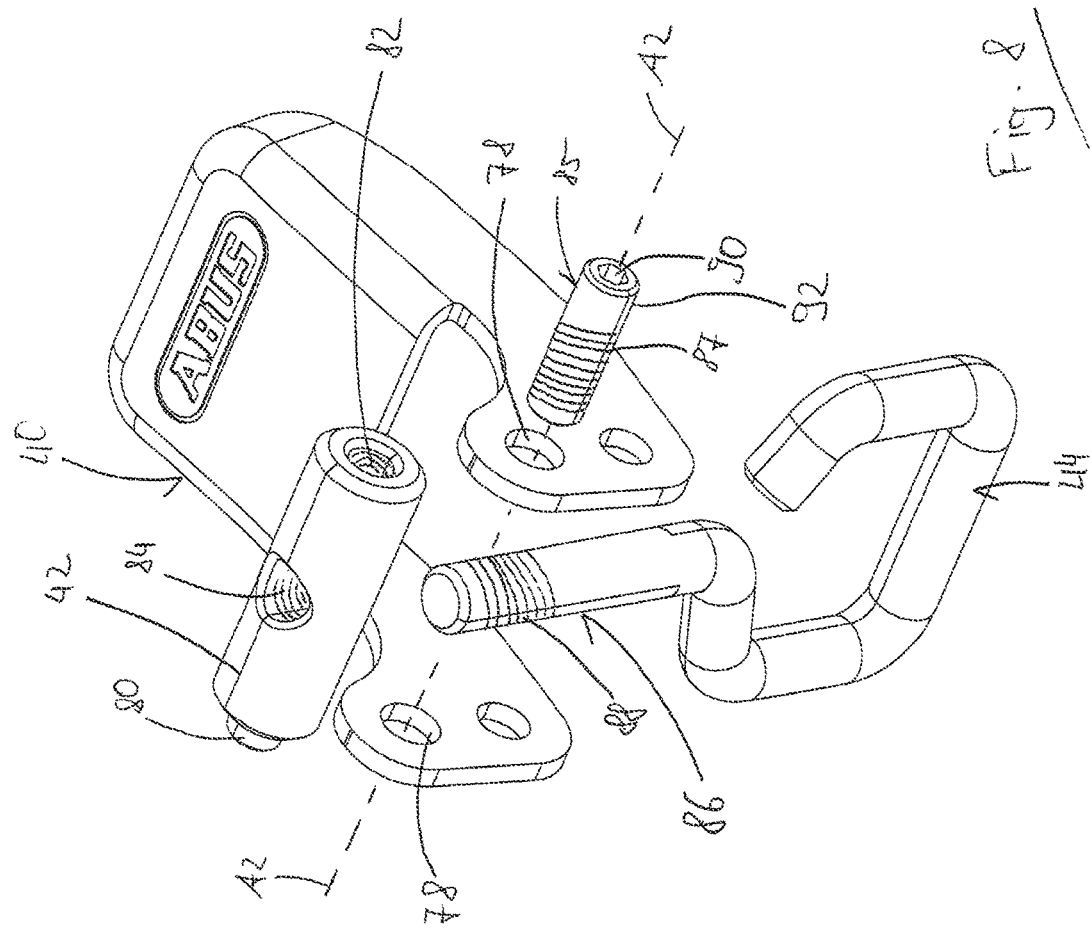
Figure 9:
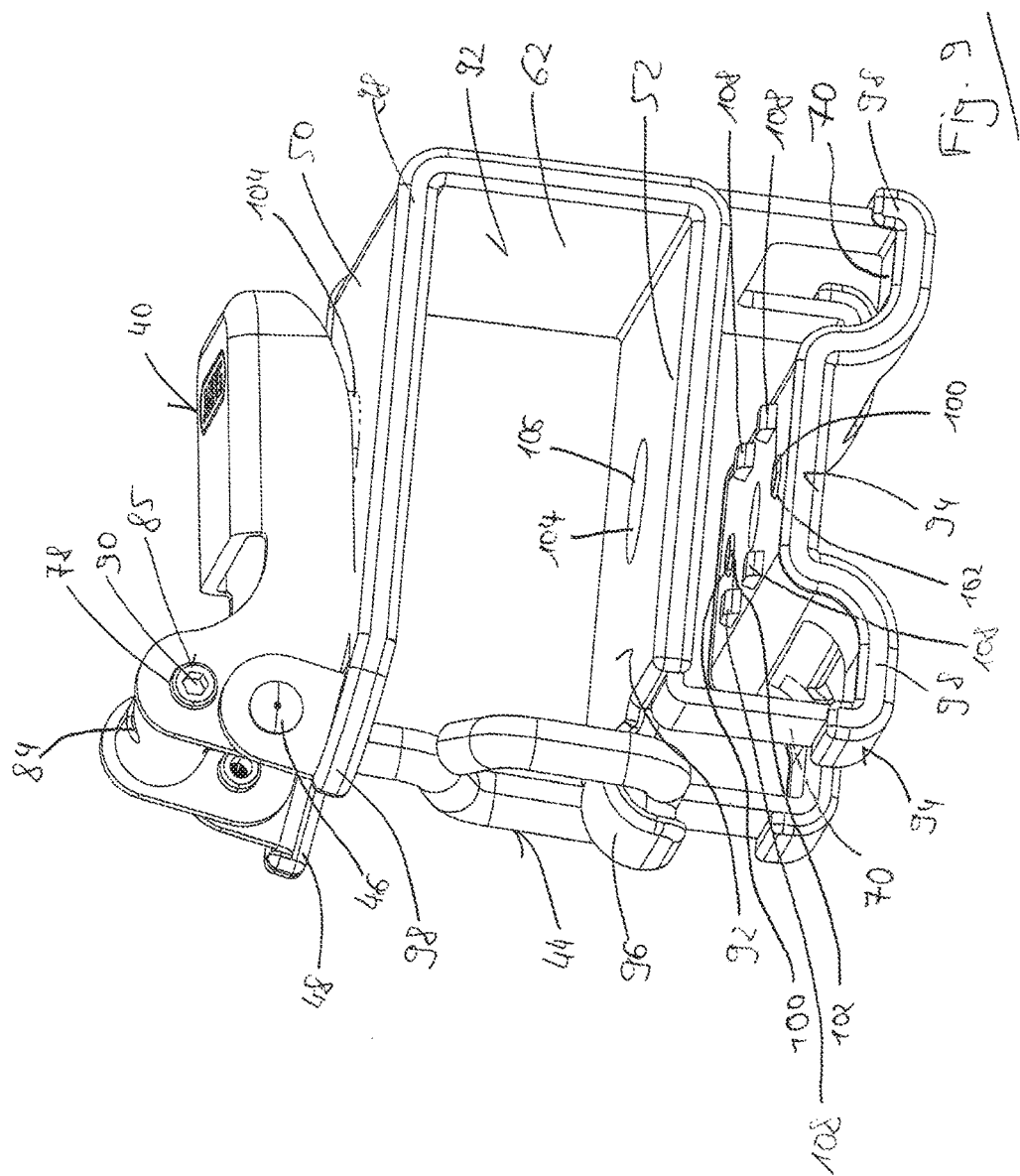
Figure 10:
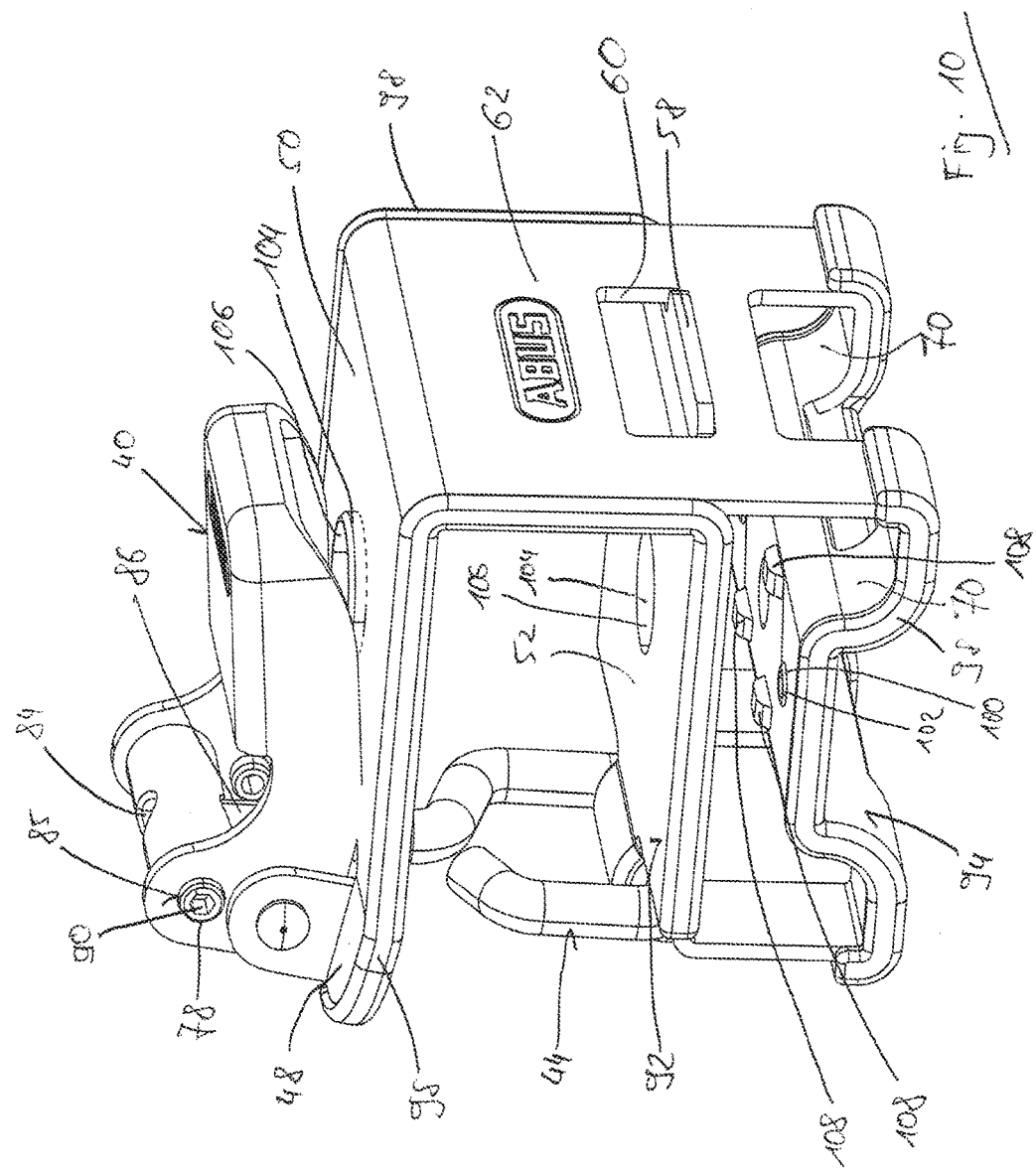

The invention will be described in the following purely by way of example with reference to the drawings. There are shown:

FIG. 1 a first embodiment of a holder in accordance with the invention with a two-wheeler lock fastened therein in a perspective view from above;

FIG. 2 the holder and the two-wheeler lock of FIG. 1 in a perspective view from below;

FIG. 3 the holder of FIG. 1 in a perspective view from above:

FIG. 4 the holder of FIG. 1 in a perspective view from below:

FIG. 5 a second embodiment of a holder in accordance with the invention with a two-wheeler lock fastened therein in a perspective view from above;

FIG. 6 the holder of FIG. 5 in a perspective view from above:

FIG. 7 the holder of FIG. 5 in a perspective view from below:

FIG. 8 a clamping lever and a clamping hoop in an exploded view;

FIG. 9 a third embodiment of a holder in accordance with the invention in a perspective view; and FIG. 10 the holder of FIG. 9 in a further perspective view.

FIG. 1 shows a first embodiment of a holder 10 in which a folding lock 12 is fastened. The folding lock 12 comprises a lock body 14 which has a housing section 16. The housing section 16 has an elongate (for example parallelepiped-shaped or cylindrical) base shape with a first end region 18 and a second end region 20 which are disposed opposite one another with respect to a housing axis L defined hereby. The housing section 16 merges in the first end region 18 in an aligned manner into a flat, tongue-shaped fastening section 22 and in the second end region 20 in an aligned manner into a flat, tongue-shaped guide section 23.

The folding lock 12 furthermore comprises a lock hoop in the form of a jointed bar hoop 24 which can be folded together to form a compact unit and which can preferably also be latched to the clock body 14 in this state. After the removal of the folding lock 12 from the holder 10, the jointed bar hoop 24 can be folded apart in the unlatched state of the folding lock 12 in order to form a loop in a manner known per se and hereby to lock a two-wheeler or to secure it to another object (e.g. a bicycle stand).

The jointed bar hoop 24 in detail has a plurality of joint bars 26 of which one is formed as a locking bar 28. The jointed bars 26 and the locking bar 28 are each flat and preferably comprise steel which is surrounded by a plastic jacket 30 to avoid damage to the two-wheeler to be locked. The jointed bars 26 and the locking bar 28 are connected to one another in series in an articulated manner by a respective rivet 32 such that the joint axes extend in parallel with or coaxial to one another and the jointed bar hoop 24 can be folded together in the manner of a yardstick. In the folded-together state of the jointed bar hoop 24, the longitudinal axes of the jointed bars 26 and of the locking bar 28 extend in a plane in parallel with one another. A first end 34 of the jointed bar hoop 24 is connected in an articulated manner, i.e. is pivotably fastened, to the fastening section 22 of the lock body 14. A second end 36 of the jointed bar hoop 24 is formed by the free end of the locking bar 28 which serves as a locking section.

A lock cylinder (not shown) is provided in the lock body 14; it serves as a locking mechanism and selectively moves a latch (likewise not shown) into a release position or into a closed position by rotating a key 38. The locking bar 28 can be locked in the lock body 14 in the closed position.

An axis of rotation and the direction of introduction of the key 38 into the lock body 14 define a direction of extent of the housing section 16 which corresponds to the already named housing axis L. A transverse direction Q, in which the fastening section 22 and the guide section 23 project from the housing section 16, is defined by the axial direction of extent of the jointed bars 26 (away from the housing section 16). The transverse direction Q therefore extends at an angle of 90° from the housing axis L.

The folding lock 12 is fastened in the holder 10 which is shaped from a resilient metal sheet. The holder 10 has a clamping lever 40 which is pivotable about a first pivot axis A1. The clamping lever 40 comprises a rotatably supported cylindrical axial section 42 in which in turn a clamping hoop 44 is fastened by means of a thread (not shown). An effective length of the clamping hoop 44 can be varied by rotation in the thread. The clamping hoop 44 is supported at the clamping lever 40 via the rotatably supported axial section 42 pivotably about a second pivot axis A2 which is aligned in parallel with the first pivot axis A1.

The clamping lever 40 is pivotably connected via two rivets 46 to an angled support section 48 of a first holding section 50 which projects beyond the folding lock 12 or beyond the jointed bar hoop 24. The rivets 46 are each rotatably anchored in a perpendicular bend 49 of the support section 48 and in the clamping lever 40. The first holding section 50 substantially defines a rectangular planar surface which areally contacts an upper side of the jointed bar hoop 24 of the folding lock 12 in the fixed position. The perpendicular bends 49 project in a perpendicular manner from the planar surface defined by the angled support section 48 and extend away from the folding lock 12.

In the shown fixing position of the clamping lever 40, the clamping lever 40 lies on an upper side of the first holding section 50. A pivot movement of the clamping lever 40 is thus bounded at one side by the first holding section 50.

The axes of rotation of the rotatable rivets 46 define the first pivot axis A1 about which the clamping lever 40 is pivotable. The cylindrical axial section 42 defines the second pivot axis A2 about which in turn the clamping hoop 44 is pivotable. On a pivoting of the clamping lever 40 about the first pivot axis A1, the position of the second pivot axis A2 changes in this respect.

In the Figures, the holder 10 is respectively shown in the fixing position of the clamping lever 40 in which the first holding section 50 lies areally on the folded-together jointed bar hoop 24 provided that the folding lock 12 is placed into the holder 10.

In addition, in the fixing position, the jointed bar hoop 24 is clamped between the first holding section 50 and a second holding section 52 shown in FIG. 2 and is fastened in this manner. The second holding section 52 substantially defines a rectangular planar surface which areally contacts a lower side of the jointed bar hoop 24 in the fixed position. In a plan view of the holder 10, the edges of the first holding section 50 and of the second holding section 52 extending in the longitudinal direction L are aligned.

A support section of the second holding section 52 projects from the second holding section 52 in the form of a reception projection 54. The reception projection 54 has a depression 55 into which a straight transverse section 57 of the clamping hoop 44 engages in the fixing position such that the clamping hoop 44 is pivotably held at the reception projection 54. A releasable pivotal connection between the clamping hoop 44 and the second holding section 52 is hereby formed with a third pivot axis A3 (within the depression 55). The effective length of the clamping hoop 44 extends between the straight transverse section 57 and the axial section 42 and is selected in this respect such that the jointed bar hoop 24 and thus the folding lock 12 are clamped immovably between the first holding section 50 and the second holding section 52 in the fixing position.

Due to the resilient material of the holder 10, the holder 10 has an inherent elasticity as a result of which the first holding section 50 (including the angled support section 48) and the second holding section 52 (including the reception projection 54) can move relative to one another. On such a relative movement, an angle between the holding sections 50, 52 or between parts hereof changes.

In the fixing position of the clamping lever 40 shown in the Figures, the holding sections 50, 52 are arranged closer to one another with respect to a removal position, whereby a force which draws the clamping hoop 44 into the depression 55 acts on the locking device formed from the clamping lever 40, the clamping hoop 44 and the reception projection 54 due to the inherent elasticity of the first and second holding sections 50, 52 relative to one another. The force path is closed via the first and second holding sections 50, 52 contacting the folding lock 12.

In the shown fixing position, the second pivot axis A2 is located, viewed in the longitudinal direction L in accordance with FIG. 1, at the side facing the folding lock 12 or the jointed bar hoop 24 with respect to the first pivot axis A1. A holding force exerted by the clamping hoop 44 thus presses the clamping lever 40 onto the first holding section 50.

To release the clamping lever 40 from the first holding section 50, this holding force has to be overcome, with the force to be overcome initially increasing on a movement of the clamping lever 40 in the direction of the release position until the clamping lever 40 has reached a dead center position. In the dead center position, the first pivot axis A1, the second pivot axis A2 and the third pivot axis A3 lie on a straight line or in a plane. If the clamping lever 40 is moved beyond the dead center position in the direction of the release position, the second pivot axis A2 is in this respect displaced such that the second pivot axis A2 lies, viewed in the longitudinal direction L, on the side remote from the folding lock 12 or from the jointed bar hoop 24 with respect to the first pivot axis A1. From the running through of the dead center position onward, the force resulting from the increasing relaxation of the holder urges the clamping lever 40 further in the direction of the release position.

In the release position, no force is exerted on the locking device so that the clamping hoop 44 can be removed from the depression 55 to remove the folding lock 12 out of the holder 10, for example along the longitudinal direction L. The folding lock 12 can likewise be removed from the holder 10 against the transverse direction Q.

It must still be noted with respect to the described clamping function of the locking device that the named holding force, which acts on the first and second holding sections 50 in the fixing position of the clamping lever 40 and which is temporarily increased on passing through the dead center position of the clamping lever 40, in particular results from an elastic deformation of the angled support section 48 of the first holding section 50 (relative to a contact section of the first holding section 50 provided for the clamping of the folding lock 12). A corresponding resilience of the reception projection 54 (including the depression 55) can also be provided to a lesser degree.

The holder 10 is shown in more detail with reference to FIGS. 3 and 4. The holder 10 is manufactured, for example, from a rectangular metal sheet by means of a punch and bend process.

It can be seen from FIG. 3 that an oval cut-out 56 which serves for a weight reduction is introduced into the second holding section 52. The second holding section 52 merges into a rectangularly shaped tongue 58 in the side disposed opposite the reception projection 54 (FIG. 4). The tongue 58 extends into a cut-out 60 of a connection section 62. The size of the cut-out 60 is selected such that the tongue 58 allows a movement of the second holding section 52 toward the first holding section 50 and away from the first holding section 50. The holder 10 comprises an additionally increased inherent elasticity due to the relative movement of the holding sections 50, 52 made possible in this manner.

The connection section 62 projects from the first holding section 50 and is produced by bending over the region of the first holding section 50 disposed opposite the angled support section 48. The connection section 62 defines a planar surface which extends approximately perpendicular with respect to the surfaces defined by the first holding section 50 and the second holding section 52. A reception opening which is U-shaped in cross-section and into which the folding lock 12 can be introduced is therefore defined by the connection section 62 and the holding sections 50, 52. The spacing and the angle between the holding sections 50, 52 in the starting position can be selected such that a clamping force is already exerted by the holding sections 50, 52 onto the two-wheeler lock 12 on a (preferably lateral) insertion of the two-wheeler lock 12 into the reception opening and still in the removal position of the clamping lever), said clamping force provisionally securing the two-wheeler lock 12 against falling out of the holder until the reversing of the clamping lever 40 into the fixing position.

A support region 64 which serves for contacting a tube section (not shown) of a two-wheeler is formed by bending over the sheet metal material at an end of the connection section 62 disposed opposite the first holding section 50. The support region 64 comprises a central rectangular planar region 66 into which three fastening holes 68 are introduced. The fastening holes can be reached through the oval cut-out 56 by means of an angled tool.

Prism-shaped projections 70 are respectively provided at both sides at the ends (viewed in the transverse direction Q) of the support region 64 along a direction of extent which is defined by the fastening holes 68 and which corresponds to the transverse direction Q in accordance with FIG. 1, with two respective projections 70 being aligned with one another, viewed in the transverse direction Q.

A respective elongate recess 72 is provided between two aligned projections 70. The elongate recesses 72 serve to allow a fastening of the holder 10 by means of a tension belt (not shown) or by means of a clip (likewise not shown). The tension belt or the clip can be guided between the support region 64 and the second holding section 52 and can press the central plane 66 onto the frame of a two-wheeler. In this respect, the tension belt or the clip can extend into the elongate recesses 72.

The sheet metal material 64 is bent over at a 90° angle at a side of the support region 64 disposed opposite the connection section 62, whereby the support region 64 merges into the second holding section 52. The second holding section 52 extends, starting from the transition, out of the support region 64 up to and into the cut-out 60.

Apart from the clamping lever 40 and the clamping hoop 44, the holder 10 are shaped completely from a rectangular metal sheet by means of a punch and bend method. In this respect, a first end region of the metal sheet forms the first holding section 50 and the oppositely disposed second end region forms the second holding section 52. Viewed from the first holding section 50, the metal sheet then first merges into the connection section 62, subsequently into the support region 64 and finally into the second holding section 52.

The shape of the holder 10 can in this respect be created by a respective bending over of the metal sheet. The cut-out 60, the fastening holes 68 and the oval cut-out 56 can be punched out of the metal sheet before the bending over.

The holder 10 is open at the two mutually opposite front faces (i.e. viewed along the pivot axes A1, A2, A3), with the outer edges associated with the front faces extending from the first holding section 50, the connection section 63 and the second holding section 52 in a respective normal plane with respect to the axis about which the first holding section 50, the connection section 62 and the second holding section 52 are angled relative to one another. In a simplified embodiment (in particular without an additional support region 64, not shown), this design also allows an inexpensive manufacture by cutting an extruded section to length.

A second embodiment of the holder 10 is shown in FIGS. 5 to 7. The second embodiment of the holder 10 differs from the first embodiment in that the clamping lever 40 is attached to a fastening tongue 74 (FIG. 6) of the second holding section and thus lies adjacent to the tube section (not shown) of a two-wheeler in the fixing position shown in FIG. 5.

The clamping lever engages in the second embodiment into the depression of the reception projection 54 which projects out of the first holding section 50 in this embodiment. In addition, the clamping lever 40 has a U-shaped design.

The holding force for clamping the folding lock 12 between the first and second holding sections 50, 52 and for a stable holding of the clamping lever 40 in its fixing position is effected in this embodiment substantially by an elastic deflection of the reception projection 54 (relative to the first holding section 50) and of the second holding section 52 (relative to the support region 64).

The first holding section 50 and the second holding section 52 have two concentric cut-outs 76 respectively aligned with one another in the second embodiment. An access to the two fastening holes 68 of the second embodiment is possible by means of an elongate tool through the aligned concentric cut-outs 76.

FIG. 8 shows in an exploded view an embodiment of a clamping lever 40 to which a clamping hoop 44 is pivotably fastened. An axial section 52 which is formed by a threaded bushing is rotatably supported at the clamping lever in aligned holes 78 of the clamping lever 40. The axial section 42 comprises a bearing pin 80 at a first axial end. An axially extending first threaded bore 82 is introduced into the axial section 42 at a second axial end and extends up to a second threaded bore 84. The cavities produced by the threaded bores 82, 84 merge into one another so that a wall of the second threaded bore 84 comprises an opening (not visible in FIG. 8) which forms a passage to the first threaded bore 82. The second threaded bore 84 extends perpendicular to the axial direction of extent of the axial section 42 and thus perpendicular to the first threaded bore 82.

A threaded pin 85 is provided which has a first external thread 87. The first external thread 87 of the threaded pin 85 is screwed to the internal thread of the first threaded bore 82. The threaded pin 85 can be rotated by means of an engagement depression 90 using a hexagon socket wrench.

The clamping hoop 44 comprises a longitudinal section 86 having a second external thread 88. The second external thread 88 is screwed to the internal thread of the second threaded bore 84 and allows the effective length of the clamping hoop 44 to be set.

To fix the clamping hoop 44 in the second threaded bore 84, the threaded pin 85 is screwed so far into the first threaded bore 82 until the fastening position is reached in which the threaded pin 85 presses onto the second external thread 88 and thereby prevents a rotation of the clamping hoop 44. The effective length of the clamping hoop 44 can then no longer be changed unintentionally, i.e. without releasing the threaded pin 85.

In the fastening position, a bearing section 92 which does not have a first external thread 87 projects out of the axial section 42. The bearing section 92 and the bearing pin 80 come to lie in the aligned holes 78 (as is shown in FIGS. 9 and 10) and thus allow a rotation of the axial section 42 about the second pivot axis A2.

FIGS. 9 and 10 show a third embodiment of the holder 10. The third embodiment differs from the first embodiment substantially in that a first protective element 92 and a second protective element 94 are provided.

The protective elements 92, 94 are shaped from a plastic and serve for avoiding damage to the folding lock 12 and to a frame of the two-wheeler.

The first protective element 92 has an approximately U-shaped form and respectively covers the side of the angled support section 48, of the first holding section 50, of the connection section 62, of the second holding section 52 and (by a projection 96) of the reception projection 54 which faces the folding lock 12.

The second folding lock 94 covers the support region 64 at that side which is associated with a frame of the two-wheeler. The second protective element 94 in this respect engages over the prism-shaped projections 70.

Both the first and second protective elements 92, 94 comprises peripheral beads 98 which engage around the edges of the holder 10.

The second protective element 94 comprises two small mushroom-headed clip element 100 which engage into bores 102 of the support region 64 to fasten the second protective element 94 to the support region 64 (FIGS. 9 and 10).

The first protective element 92 comprises two large ring-shaped clip elements 104 which each project through round cut-outs 106 in the first holding section 50 and in the second holding section 52 to fasten the first protective element 92. The large clip element 104 which fastens the first protective element 92 to the first holding section 50 can be recognized in FIG. 10.

The large clip elements 104 comprise a round cut-out and thus allow to operate a screw to be operated for fastening the holder 10 using a tool through the holding sections 50, 52, with the screw head (not shown) of said screw being arranged in the intermediate space between the support region 64 and the second holding section 52.

Four cams 108, which project from the central plane 66, project into the intermediate space between the support region 64 and the second holding section 52. The cams 108 form the corners of a rectangle and serve as a guide for a fastening clip (so-called monoclip) or as a lock for a fastening band (e.g. a gummed hook-and-loop fastener) which each fasten the holder 10 to the frame of a two-wheeler.

To fasten the folding lock 12 in the holder 10, the jointed bar hoop 24 of the folding lock 12 in the removal position (not shown) of the clamping lever 40 is brought—independently of the selected embodiment—between the first holding section 50 and the second holding section 52. The first holding section 50 and the second holding section 52 are moved toward one another by means of the clamping hoop 44 by moving the clamping lever 40 into the fixing position shown in the Figures, whereby an angle between the first holding section 50 and the second holding section 52 changes. The jointed bar hoop 24 is clamped between the first holding section 50 and the second holding section 52 and is thus fastened to the holder by the relative movement toward one another.

In the three embodiments shown in FIGS. 1 to 10, the clamping hoop 44 always remains fastened to the clamping lever 40 even if the locking device is open (i.e. is released from one of the two holding sections). It is, however, alternatively also possible to provide a releasable pivotal connection between the clamping hoop 44 and the clamping lever 40 (i.e. at the position of the second pivot axis A2). The clamping lever 40 can in particular be pivotably supported (first pivot axis A1) at the first holding section 50 of the holder, with a first and a second connection device for a releasable pivotal connection being provided at the clamping lever 40 and at the clamping hoop 44 (for example, a projection, on the one hand, and an associated opening, on the other hand) in order to be able to selectively pivotably fasten (pivot axis A2) the clamping hoop 44 to the clamping lever 40, and with the clamping hoop 44 being pivotably supported (third pivot axis A3) at the second holding section 52 of the holder. The second pivot axis A2 is also displaced, preferably in parallel, with respect to the first pivot axis A1 in such an embodiment so that, on a movement of the clamping lever 40 out of the removal position into the fixing position, the second pivot axis A2 carries out an eccentric movement path with respect to the first pivot axis A1 and hereby a dead center position can be passed through.

In accordance with a further alternative, it is also possible to provide a releasable pivotal connection between the clamping lever 40 and the first holding section 50 of the holder (i.e. at the position of the first pivot axis A1), whereas the clamping hoop 44 is permanently pivotably connected both to the clamping lever 40 (second pivot axis A2) and to the second holding section 52 of the holder (third pivot axis A3).

REFERENCE NUMERAL LIST 10 holder
12 folding lock
14 lock body
16 housing section
18 first end region
20 second end region
22 fastening section
23 guide section
24 jointed bar hoop
26 jointed bar
28 locking bar
30 plastic jacket
32 rivet
34 first end
36 second end
38 key
40 clamping lever
42 axial section
44 clamping hoop
46 rotatable rivets
48 angled support section
49 perpendicular bend
50 first holding section
52 second holding section
54 reception projection
55 depression
56 oval cut-out
57 straight transverse section of the clamping hoop
58 tongue 60 cut-out
62 connection section
64 support region
66 central plane
68 fastening hole
70 prism-shaped projection
72 elongate recess
74 fastening tongue
76 concentric cut-out
78 aligned holes
80 bearing pin
82 first threaded bore
84 second threaded bore
85 threaded pin
86 longitudinal section
87 first external thread
88 second external thread
90 engagement depression
92 first protective element
94 second protective element
96 projection
98 bead
100 small clip element
102 bore
104 large clip element
106 cut-out
108 cam
L housing axis
Q transverse direction
A1 first pivot axis
A2 second pivot axis
A3 third pivot axis

The invention claimed is:

1. A holder (10) for a two-wheeler lock (12), in particular of the type of a folding lock, comprising
a support region (64) for contacting a tube section of a two-wheeler; and
a mount which comprises at least one first holding section (50) and one second holding section (52), wherein the first holding section (50) and the second holding section (52) are spaced apart from one another and define a reception opening for the two-wheeler lock, and wherein the first holding section (50) includes an angle with the second holding section (52),
wherein the angle between the first holding section (50) and the second holding section (52) is variable, with the holder (10) having a locking device which is effective between the first holding section (50) and the second holding section (52) of the mount and which has a clamping lever (40) which is movable between a fixing position and a removal position, with the two-wheeler lock (12) located in the reception opening being fixable by means of clamping by movement of the clamping lever (40) out of the removal position into the fixing position, wherein the locking device comprises a clamping hoop (44); wherein a first pivotal connection having a first pivot axis (A1) is provided between the clamping lever (40) and the first holding section (50); wherein a second pivotal connection having a second pivot axis (A2) is provided between the clamping hoop (44) and the clamping lever (40); and wherein a third pivotal connection having a third pivot axis (A3) is provided between the clamping hoop (44) and the second holding section (52) of the mount; and wherein at least one of the pivotal connections is releasable and has a first connection device (57) and a second connection device (54).

2. A holder (10) in accordance with claim 1,
wherein the clamping hoop (44) has an effective length between the second pivot axis (A2) and the third pivot axis (A3), the effective length being adjustable.

3. A holder (10) in accordance with claim 2,
wherein the effective length of the clamping hoop (44) is adjustable steplessly and/or by means of a screw thread.

4. A holder (10) in accordance with claim 2,
wherein an adjustment of the effective length of the clamping hoop (44) can be selectively suppressed by means of a fixing means.

5. A holder (10) in accordance with claim 4,
wherein the fixing means is arranged rotatable about the second pivot axis (A2) and/or the fixing means is a component of a bearing seat of the second pivot axis (A2).

6. A holder (10) in accordance with claim 4,
wherein the fixing means comprises a threaded pin (85) which extends axially along the second pivot axis (A2); and wherein a first axial end of the threaded pin (85) selectively exerts a force on the clamping hoop (44).

7. A holder (10) in accordance with claim 1,
wherein the clamping hoop (44) is urged away from the first or second holding section (50, 52) by means of a clamping element at least in the release position.

8. A holder (10) in accordance with claim 1,
wherein the second pivot axis (A2) lies, in a dead center position of the locking device, on a straight line which extends through the third pivot axis (A3) and through the first pivot axis (A1).

9. A holder (10) in accordance with claim 1,
wherein the holder (10) at least has an elasticity which is tensioned when a two-wheeler lock (12) is inserted into the reception opening and the clamping lever (40) is moved into the fixing position, and hereby exerts a holding force on the two-wheeler lock (12), on the one hand, and stabilizes the clamping lever (40) in the fixing position, on the other hand; and wherein the elasticity is adapted to be increasingly tensioned by movement of the locking device in the direction of a or the dead center position and to be increasingly relaxed after passing through the dead center position.

10. A holder (10) in accordance with claim 9,
wherein the elasticity is formed by an inherent elasticity of at least a part of the first holding section (50) and/or of the second holding section (52) of the mount; and/or wherein the elasticity is formed by an elastic support at the first holding section (50) and/or at the second holding section (52) of the mount.

11. A holder (10) in accordance with claim 10,
wherein the first holding section (50) and/or the second holding section (52) of the mount has a resilient support section (48, 54) at which a part of the locking device is supported and which is temporarily deflectable on passing through the dead center position of the locking device.

12. A holder (10) in accordance with claim 1,
wherein the two-wheeler lock (12) is fastenable to the mount solely by means of clamping between the first holding section (50) and the second holding section (52).

13. A holder (10) in accordance with claim 1,
wherein the first holding section (50) and the second holding section (52) are connected by means of a connection section (62), with the first holding section (50), the connection section (62) and the second holding section (52) together forming a C-shaped design or a U-shaped design.

14. A holder (10) in accordance with claim 13, wherein the two-wheeler lock (12) can be inserted through the open side of the C-shaped or U-shaped design of the mount into the reception opening in the removal position of the clamping lever (40).

15. A holder (10) in accordance with claim 1, wherein a respective protective element (92, 94) is arranged at least regionally for contacting the two-wheeler lock (12) on the first holding section (50) and/or on the second holding section (52) and/or on a connection section (62) of the mount, which connects the first holding section (50) and the second holding section (52), and/or on the support region (64).

16. A two-wheeler lock (12) having a holder (10) in accordance with claim 1.

17. A two-wheeler lock (12) in accordance with claim 16, wherein the two-wheeler lock (12) and the holder (10) are adapted such that the two-wheeler lock (12) can already be received in the release position of the clamping lever (40) while forming a clamping seat in the reception opening.

18. A two-wheeler lock (12) in accordance with claim 16, wherein the two-wheeler lock (12) and the holder (10) are adapted such that the two-wheeler lock (12) can be received in a shape-matched manner in the reception opening.

19. A two-wheeler lock (12) in accordance with claim 16, wherein the two-wheeler lock (12) and the holder (10) are adapted such that the two-wheeler lock (12) located in the reception opening can be fixed in a force-transmitting manner by the movement of the clamping lever (40) out of the removal position into the fixing position such that individual components (26, 28) of the two-wheeler lock (12) are fixed relative to one another.

* * * * *